Patented June 3, 1924.

1,496,198

UNITED STATES PATENT OFFICE.

JOHN J. AURYNGER, OF BROOKLYN, NEW YORK.

NONINFLAMMABLE CELLULOID.

No Drawing.     Application filed June 19, 1922. Serial No. 569,441.

*To all whom it may concern:*

Be it known that I, JOHN J. AURYNGER, a citizen of the United States, residing at Brooklyn, in the county of Kings and State of New York, have invented a new and useful Noninflammable Celluloid, of which the following is the specification.

The object of the invention is the production of a non-inflammable waterproof composition, cement or lacquer which may be used for electrical insulation, a vehicle for the sensitive photographic salts, airplane dope and the various items for which celluloid is used.

The process relates to the formation of imitation agate. The cellulose is converted into a silicate by the reaction of the hydroxides of silicon which are more commonly known as the acids of silicon. The coloring is due to the presence of impurities and metallic oxides such as the oxide of iron which gives it a red color.

This composition consists of a mixture of collodion cotton or cellulose nitrate and an equal amount of the hydroxides or chloride of silicon or the silicates of sodium and potassium. The addition of amounts of the above compounds containing equal molecular proportions of an acid to an alkaline solution will produce a composition neutral in reaction. To this fireproofing compound may be added other ingredients which are used in the manufacture of celluloid, cement, airplane dope and lacquer. It is often found convenient to dissolve the cellulose nitrate in alcohol and ether before adding the soluble silicate. A plastic mass is obtained by dissolving the cellulose nitrate in alcohol and ether or other solvent to which is added the soluble silicate. In preparing noninflammable celluloid two parts of cellulose nitrate are mixed with an equal amount of a soluble silicate and approximately one part of camphor. The plastic mixture is next heated to a temperature of about 215 degrees F. which removes the volatile solvents and the plastic mass is then rolled into sheets or molded into various forms.

The methods for making celluloid cements, airplane dopes and lacquers are similar. The ingredients are the same and more solvent containing a substantial amount of cellulose nitrate added to make a thin liquid which will spread easily on any surface.

Various ingredients are used to increase the pliability and prevent shrinkage, cracking or peeling among which may be mentioned castor oil, naphthaline and oil of cassia.

The cement may be used as a binder for cementing cheaper materials, including the oxides of metals and powdered stone. Before the celluloid becomes hard, the plastic mass is pressed into any desired form.

I claim:

1. A composition consisting of a soluble cellulose compound dissolved in a solvent and an equal amount of a soluble silicate substantially as described.

2. A pliable composition adapted to form a noninflammable vehicle for holding sensitive photographic salts comprising two parts of soluble cellulose compound and a solvent, an equal amount of soluble silicate containing such amounts of silicic acid and an alkaline silicate that the resulting composition will be neutral in reaction and approximately one part of camphor.

3. A pliable composition adapted to form a waterproof, noninflammable electrical insulation comprising two parts of a soluble cellulose compound and a solvent, an equal amount of a soluble silicate, approximately one part of camphor and castor oil.

4. A plastic composition adapted to form a noninflammable binder comprising two parts of a soluble cellulose compound and a solvent, an equal amount of a soluble silicate, approximately one part of camphor, castor oil and iron oxide.

5. A pliable neutral composition adapted to form a noninflammable vehicle for holding sensitive photographic salts comprising two parts of a soluble cellulose compound and a solvent, an equal amount of soluble silicate containing such amounts of silicic acid and alkaline silicate that the resulting composition will be neutral in reaction and approximately one part of camphor.

6. A composition as set forth in claim 5 and an additional amount of solvent.

7. A composition adapted for a lacquer as set forth in claim 3 containing an additional amount of solvent.

8. A neutral composition as set forth in claim 3 adapted for a lacquer containing additional amount of solvent.

JOHN J. AURYNGER.